United States Patent
Xie et al.

(10) Patent No.: US 7,006,128 B2
(45) Date of Patent: Feb. 28, 2006

(54) OBJECT DETECTION FOR SUDDEN ILLUMINATION CHANGES USING ORDER CONSISTENCY

(75) Inventors: Binglong Xie, Bethlehem, PA (US); Visvanathan Ramesh, Plainsboro, NJ (US); Terrance Boult, Bethlehem, PA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 637 days.

(21) Appl. No.: 10/158,632

(22) Filed: May 30, 2002

(65) Prior Publication Data

US 2003/0228058 A1 Dec. 11, 2003

(51) Int. Cl.
*H04N 7/18* (2006.01)

(52) U.S. Cl. .................. 348/143; 348/131; 356/394

(58) Field of Classification Search ............. 348/700, 348/144, 126, 143, 131, 129; 375/240.29, 375/240.16; 382/236, 151, 218; 356/394
See application file for complete search history.

(56) References Cited

U.S. PATENT DOCUMENTS

| | | | |
|---|---|---|---|
| 4,805,123 A | * | 2/1989 | Specht et al. ............... 382/144 |
| 5,353,061 A | * | 10/1994 | Rodriguez et al. ...... 375/240.12 |
| 6,307,888 B1 | * | 10/2001 | Le Clerc ............... 375/240.29 |
| 6,404,461 B1 | * | 6/2002 | Le Clerc .................... 348/700 |

\* cited by examiner

*Primary Examiner*—Gims Philippe
(74) *Attorney, Agent, or Firm*—Donald B. Paschburg; F. Chau & Associates, Ltd.

(57) ABSTRACT

A system and method for object detection with sudden illumination changes provides a system including a camera model unit for computing a difference map between a first input image and a second input image, an illumination model unit in signal communication with the camera model unit for comparing the sign of the difference between two pixels in a first input image against the sign of the difference between two pixels in a second input image, and a CPU in signal communication with the camera model unit and the illumination model unit for detecting a changed object in accordance with said comparison when said sign of the difference is changed; and a corresponding method including providing a first image having a number of pixels, receiving a second image subsequent to the first image, calculating a difference map between the first and second images, selecting a pair of pixel locations from the first or second images in accordance with the difference map, statistically modeling a camera noise level for the first and second images, computing the likelihood of order inconsistency between a pair of pixel values at the selected locations in the first image and a pair of pixel values at the selected locations in the second image in accordance with the camera noise level; and detecting a changed object in accordance with the computed likelihood.

43 Claims, 4 Drawing Sheets

OBJECT DETECTION FOR SUDDEN ILLUMINATION CHANGES USING ORDER CONSISTENCY

BACKGROUND

In appearance-based methods for object detection and/or recognition, images indicative of the objects of interest are typically limited to constant and/or slowly varying illumination conditions. Detection of objects within an image is typically compromised by sudden changes in illumination.

Object detection in video surveillance systems, for example, is typically achieved with background subtraction or by using temporal differences. Most change detection methods employ adaptive background models. These methods work well when there are no illumination changes, or only slow illumination changes. Unfortunately, when there is a sudden illumination change, such as might be caused by turning on a light, these methods generally fail.

Dynamic illumination changes with varying degrees of change have also been handled with a multi-scale temporal statistical model. However, the choice of the statistical model is not motivated from a careful analysis of the sensor and illumination parameters. The camera employed generally has an adaptive gain and normally responds in a nonlinear fashion to sudden illumination effects. Thus, even areas in the image not directly influenced by external light sources may change significantly.

A physically motivated approach to change detection has also been presented. In that approach, a homomorphic filter was used to facilitate change detection under illumination changes. Another approach known as the wallflower system maintains several background models, which each represent different illumination conditions. When too many pixels are detected as changing, it checks all the background models, and the background that produces the least foreground pixels is chosen to be the current background.

A similar method was also used where, instead of maintaining more than one frame-level background model, the background was allowed to adapt to lighting changes very quickly when the growth rate of the object pixels was radical. In yet another approach, it has been shown that a Hidden Markov Model can be used to describe global state changes.

What is needed is a robust approach to scene change or object detection that is suitable for use in the presence of sudden illumination changes.

SUMMARY

These and other drawbacks and disadvantages of the prior art are addressed by a system and method of Object Detection For Sudden Illumination Changes Using Order Consistency.

The system includes a camera model unit for computing a difference map between a first input image and a second input image, an illumination model unit in signal communication with the camera model unit for comparing the sign of the difference between two pixels in a first input image against the sign of the difference between two pixels in a second input image, and a CPU in signal communication with the camera model unit and the illumination model unit for detecting a changed object in accordance with said comparison when said sign of the difference is changed.

The corresponding method includes steps for providing a first image having a number of pixels, receiving a second image subsequent to the first image, calculating a difference map between the first and second images, selecting a pair of pixel locations from the first or second images in accordance with the difference map, statistically modeling a camera noise level for the first and second images, computing the likelihood of order inconsistency between a pair of pixel values at the selected locations in the first image and a pair of pixel values at the selected locations in the second image in accordance with the camera noise level; and detecting a changed object in accordance with the computed likelihood.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method of Object Detection For Sudden Illumination Changes Using Order Consistency for appearance-based object detection in accordance with the following exemplary figures, in which.

DETAILED DESCRIPTION OF PREFERRED EMBODIMENTS

Effective change detection under dynamic illumination conditions is an active research topic. Most research has concentrated on adaptive statistical representations for the appearance of the background scene. The present disclosure develops the statistical models for background representation by taking into account an explicit model for the camera response function and camera noise, as well as illumination parameters.

Assuming a monotone but nonlinear camera response function, a Phong shading model for the surface material, and a locally constant but spatially varying illumination, the present disclosure shows that the sign of the difference between two pixel measurements is maintained across global illumination changes. This result is used along with a statistical model for the camera noise to develop a change detection algorithm that handles sudden changes in illumination. Performance evaluations of the algorithm have been performed through simulations and with real data.

Figure 1:
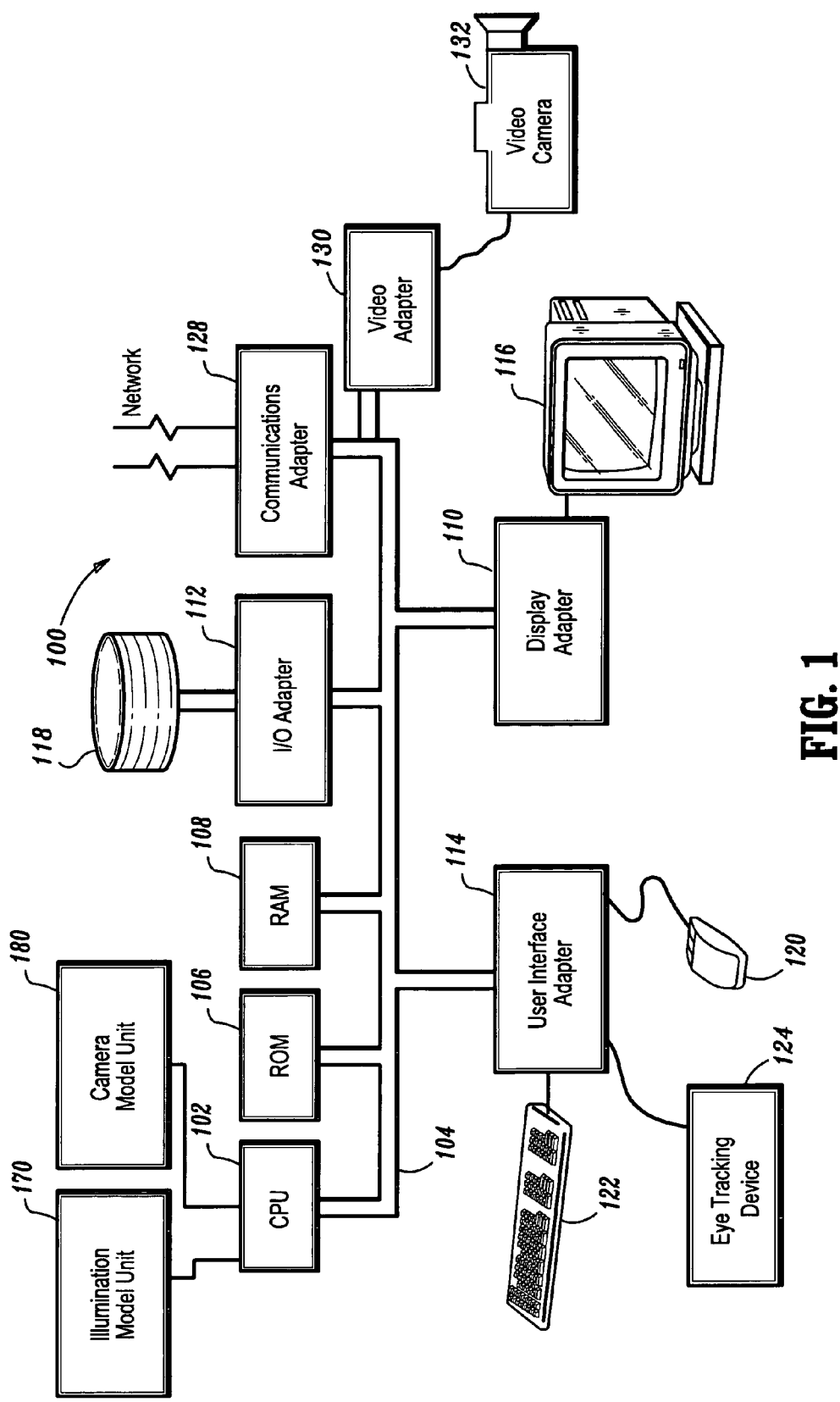
FIG. 1 shows a block diagram of a system for Object Detection For Sudden Illumination Changes Using Order Consistency according to an illustrative embodiment of the present disclosure.

FIG. 1 shows a block diagram of a system 100 for Object Detection For Sudden Illumination Changes Using Order Consistency according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, a user interface adapter 114, a communications adapter 128, and a video adapter 130 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are in signal communication with the system bus 104 via the user interface adapter 114. A video imaging device or camera 132 is in signal communication with the system bus 104 via the video adapter 130.

An illumination model unit 170 and a camera model unit 180 are also included in the system 100 and in signal communication with the CPU 102 and the system bus 104. While the illumination model unit 170 and the camera model unit 180 are illustrated as coupled to the at least one processor or CPU 102, these components are preferably embodied in computer program code stored in at least one of the memories 106, 108 and 118, wherein the computer program code is executed by the CPU 102.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the illumination model unit 170 and the camera model unit 180, as well as the other elements of the system 100, while practicing within the scope and spirit of the present disclosure.

A typical quasi-indoor video surveillance system performed well in normal settings, but typically failed under sudden change illumination settings. Therefore, a new sudden-change detection module is integrated into the present quasi-indoor video surveillance system. The new module is characterized in terms of its performance so that it can be fused with existing systems in a systematic manner. The algorithm is well motivated from physics as well as from the sensor statistical models, such that a clear understanding of the system's applicability can be attained by one of ordinary skill in the pertinent art.

Normally, sudden illumination changes cannot be suppressed at the pixel-level, and require either region-level or frame-level decisions. The presently disclosed method is able to identify whether a change in the image neighborhood values is due to an illumination change by using local information. The method may be combined with other background adaptation algorithms that have strong statistical justifications, as known in the art.

The camera gain is generally nonlinear over the incident radiance. This makes it difficult to use a parametric model for change detection. Moreover, camera response is time-variant and is a function of scene radiance. However, the camera response curve is always monotonically increasing. If the incident radiance at a given pixel is E, the camera response can be denoted as $z=h(E)$, where z is the output of the camera for the pixel with radiance E. Here h is a function of the scene, so it is a function of time.

In each frame, the monotonicity is maintained according to Equation (1) of Table A. To examine the implication of this property on change detection, the image is partitioned into two areas: one indirectly influenced by changes of light source, and the other directly influenced by the light source changes.

For the area not directly illuminated by changing light sources, this area is not directly illuminated by changing light sources but the camera response may change because of the light source changes. For example, if there are two pixels with radiance $E_1$ and $E_2$, respectively, and $E_1 <= E_2$, before the light source changes in intensity, the sensed pixel values are $z_1^{(1)}$ and $z_2^{(1)}$. According to Equation (1), $z_1^{(1)} <= z_2^{(1)}$. Although the camera gain h changes, Equation (1) is still true after the illumination change, so $z_1^{(2)} <= z_2^{(2)}$. Thus, the camera gain change does not influence the ordering of two measurements in the area of indirectly influenced pixels, even though the pixels may be distributed widely over space.

For the area directly illuminated by changing sources, this area is more or less directly illuminated by changing light sources. According to the Phong Illumination Model, the incident radiance of a pixel is given by Equation (2) of Table A, where $r(x)$ is the distance between the camera and a surface point x; $K_a(x)$, $K_d(x)$ and $K_s(x)$ are the ambient light reflection coefficient, diffuse light reflection coefficient and specular light reflection coefficient of the surface point x, respectively; $I_a$ is the ambient light intensity in the scene; i iterates over the light sources in the scene; $I_i(x)$ is the incident light intensity of light source i at point x; $\phi(x)$ is the incident angle from light source i to point x; $\theta_i(x)$ is the angle between the specular reflection light ray and view angle; $n(x)$ is a positive integer that defines how a point scatters specular lights; and k is a constant.

In this context, ambient and diffuse reflections are considered. For surface points that are close to one another, $r(x)$, $I_i(x)$ and $\phi(x)$ are approximately constant, so r, $I_i$ and $\phi$ are used instead. Thus, the radiance is indicated by Equation (3) of Table A. The difference in the radiances at two nearby points is given by Equation (4) of Table A. Here, it is reasonable to assume that $K_a(x_2) >= K_a(x_1)$ and $K_d(x_2) >= K_d(x_1)$, i.e., that the surface has similar properties for both ambient and diffuse reflection.

Therefore, Equation (5) of Table A shows that ordering of radiance values of nearby pixels is determined by the diffuse reflection coefficients, which are, in turn, determined by the surface material types. Under the assumption of locally constant illumination and smooth surface geometry, the ordering is quasi-invariant to an ambient or point light source intensity change. Since the ordering of the radiance values is preserved, Equation (1) shows that the pixel value ordering is also preserved in local neighborhoods where the pixels are directly influenced by sudden light source changes. Thus, the order of intensity measurements in a local neighborhood is preserved for all pixels in an image. It is very unlikely that this constraint is observed for object pixels in the scene. Therefore, this criterion may be used to discriminate between a change due to a light source effect or the appearance of an object.

Thus, illumination invariant change detection via order consistency is achievable because the ranking of neighborhood pixel values after a sudden illumination change is consistent with the ranking before the illumination change. A check whether the order is inverted is performed to detect if there is a possible object pixel. Since the pixel measurements are generally noisy, the camera noise model needs to be examined.

Figure 2:
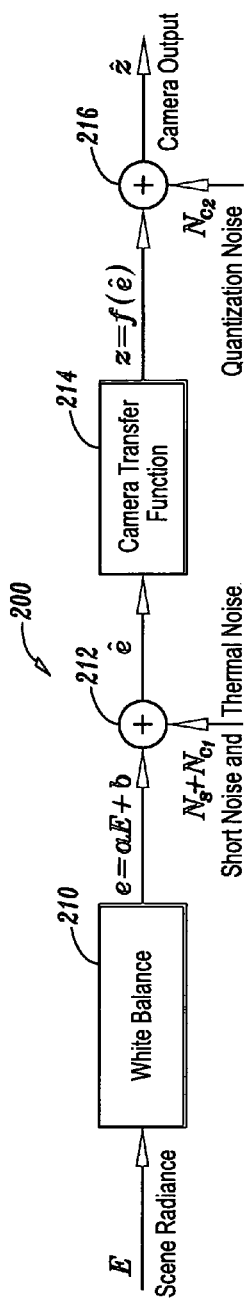
FIG. 2 shows a block diagram of a camera model for use with the system of FIG. 1.

As shown in FIG. 2, a camera model block diagram is indicated generally by the reference numeral 200. The camera response function and noise model parameters can be photometrically calibrated as known in the art. The camera model 200 includes a White Balance module 210 with exposure time adjustment. The module 210 is coupled in signal communication with a non-inverting input of a first summing block 212, which, in turn, is coupled in signal communication with a camera transfer function 214. The transfer function 214 is coupled to a non-inverting input of a second summing block 216.

In operation, the White Balance module 210 performs a linear stretching of the received radiance, resulting in a value e within [0, 1]. e is then corrupted by shot noise $N_s$ and Thermal Noise $N_{c1}$, where the variance of the shot noise is proportional to E. The corrupted White Balance output is denoted as ●, and ● is subject to the camera transfer function to obtain the internal camera output z. This value is digitized to get the observed pixel value of ž. Typically, the camera transfer function has the form $z=f(●)=255●^\alpha$, where $\alpha$ is designed to be less than 1 to compensate for the display device's $\gamma$ parameter. On the other hand, its inverse function can be used to denote the camera transfer function: ●=g(z). Because noise can be considered as a small additive perturbation, a Taylor series expansion is used to approximate z as set forth in Equation (6) of Table A, where $N_e$ is the equivalent noise term reflecting the shot and thermal noise terms at a given pixel value, as set forth by Equation (7) of Table A. Because the variance of $N_s$ is proportional to E, Equation (8) of Table A applies.

In most settings, the offset b is considered to be zero. Thus, ž is described by Equation (9) of Table A, and the noise variance in the pixel measurement is described by Equation (10) of Table A, where $\sigma_s^2$ is the unit variance term for shot noise, $\sigma_{c1}^2$ is the variance of the thermal noise, and $\sigma^{c22}$ is the variance of the quantization noise. When a camera is calibrated, Equation (10) shows that the camera noise level can be seen as a function of the pixel value, instead of the incoming radiance. It is assumed that the noise in the pixel value is zero-mean Gaussian.

Figure 3:
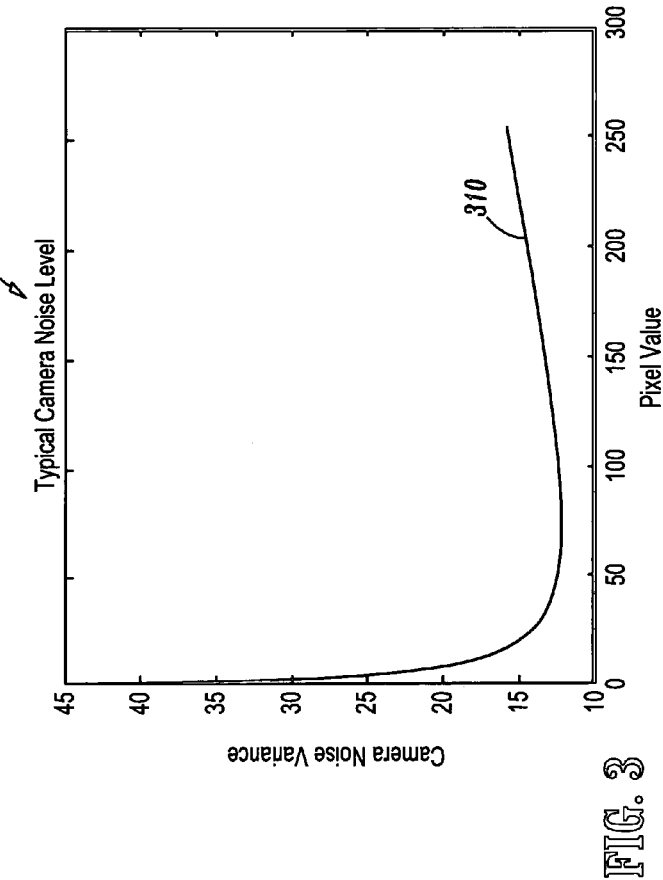
FIG. 3 shows a plot of camera noise variance versus pixel value for the camera model of FIG. 2.

Turning to FIG. 3, a plot of camera noise variance versus pixel value is indicated generally by the reference numeral 300. A typical curve 310 illustrates the camera noise variance as a function of image measurements. For the curve 310, $f(e)=255e^{5/6}$, $\sigma_s=0.015$, $\sigma_{c1}=0.01$ and $\sigma_{c2}=1$. Assuming a pixel having true pixel value determined by its radiance E with a determined camera transfer function $z=f(e)=h(E)$, due to the camera noises, what is observed is a noisy pixel value as denoted in Equation (9).

For an observed pixel value ž, the true pixel value is approximated as a Gaussian distribution with mean equal to the observed value and variance $\sigma_{Nž}^2$. Considering two pixels in a local neighborhood over two continuous frames, that is, observing two measurements for each pixel, let $ž_i^{(j)}$ denote the observed pixel value for pixel i at time j, where $i=1, 2$ and $j=1, 2$. $d^{(1)}=z_1^{(1)}-z_2^{(1)}$ and $d^{(2)}=z_1^{(2)}-z_2^{(2)}$ are defined with the assumption that the pixel measurements are independent. Then $d^{(1)} \sim N(ž_1^{(1)}-ž_2^{(1)}, \sigma_{ž1(1)}^2+\sigma_{z2}(1)^2)$ and $d^{(2)} \sim N(ž_1^{(2)}-ž_2^{(2)}, \sigma_{ž1(2)}^2+\sigma_{z2(2)}^2)$, where $N(.,.)$ denotes the normal distribution.

Since the preservation of the sign of the difference values is of interest, $P_1=P(d^{(1)}>=0)$ and $P_2=P(d^{(2)}>=0)$ are defined. $P_1$ and $P_2$ are parameters of two binomial distributed random variables, respectively. Order consistency is defined as a distance between the two distributions with parameters $P_1$ and $P_2$. The Bhattacharya coefficient is used as the distance measure, as set forth in Equation (11) of Table A, because of its interesting theoretical properties relating it to the Bayes error. When both $P_1$ and $P_2 \to 1$, or both $P_1$ and $P_2 \to 0$, D is close to 1, i.e., the ordering is highly preserved. If one of $P_1$ and $P_2$ goes to 1 but the other goes to 0, then D is close to 0, implying that the ordering is not consistent between the frames.

The reliability of D as a measure of concurrence in ordering is a function of the magnitude of $d^{(1)}$ and $d^{(2)}$. If $d^{(1)}$ and $d^{(2)}$ are 0-mean Gaussian distributions, camera noise dominates and the ordering information is unreliable for reasonable inferences. Thus, to ensure reliability, high contrast pixels are used in order checking.

An algorithm to perform change detection is as follows:

Given a reference background frame, a 2 by 2 neighborhood is considered, and the top left pixel is used as the reference pixel for comparison with the other three neighboring pixel measurements. Let j(x) be the pixel index corresponding to the index j of the pixel with largest difference between ž(x)–ž(j), therefore a pixel pair (x, j(x)) is obtained to compute $P_1(x)$ for each pixel x. This step is mainly done to improve the reliability of the comparison, instead of choosing any arbitrary pair of pixels to compare. The $P_1$'s are computed from the differences of the pixel measurements and their variances.

Given a new image, the probability $P_2(x)$ is computed for each pixel x using the pixel pair (x, j(x)). Then D(x) is computed using $P_1(x)$ and $P_2(x)$ to obtain a D-map.

For color scenes, the algorithm is applied to each color channel independently.

The D-map contains local neighborhood order consistency information. Various alternate methods may be recognized by those of ordinary skill in the pertinent art to utilize the D-map to classify the regions into objects versus illumination changes. In this exemplary embodiment, a simple thresholding is used to detect the object pixels. More sophisticated processing can additionally be performed. If the computed D is less than a certain threshold $D_t$, the pixel is treated as an object pixel. Further grouping as known in the art may be used to detect objects using a higher-level criterion.

Figure 4:
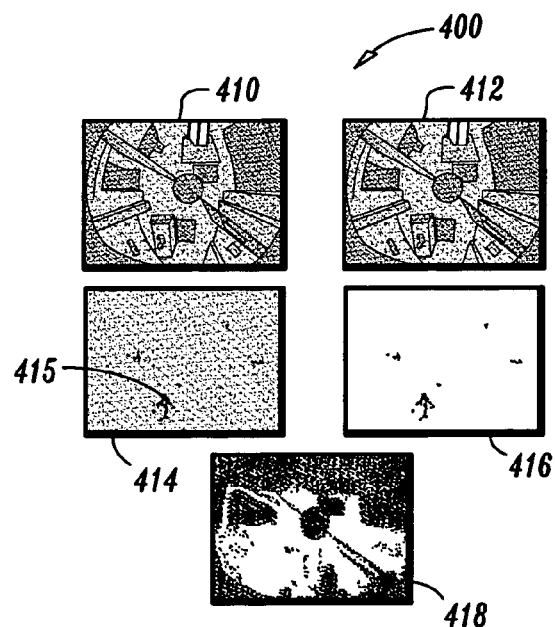
FIG. 4 shows exemplary image results of the system of FIG. 1 for an illumination change example.

Turning now to FIG. 4, exemplary results of the above-described algorithm for an illumination change example are indicated generally by the reference numeral 400. A top-left frame 410 and a top-right frame 412 are two frames from an omni-video that have a sudden illumination change between them. A center-left map 414 is the D-map of the scene, where darker points 415 represent higher order inconsistency. A center-right map 416 is the thresholded D-map with $D_t=0.50$. A bottom image 418 is the detection result based on a single Gaussian model for each pixel. Because of the strong illumination change, the bottom image 418 shows that the applied method gives false alarms throughout the scene. The order consistency method can easily suppress the illumination change with some false alarms at the edges, which are due to out-of-model assumptions and require extra treatments.

Figure 5:
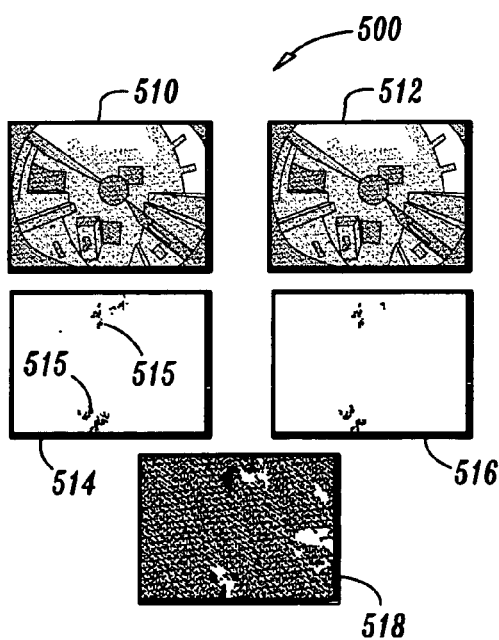
FIG. 5 shows exemplary image results of the system of FIG. 1 for an object detection example.

Turning to FIG. 5, exemplary results of the above-described algorithm for an object detection example are indicated generally by the reference numeral 500. A top-left frame 510 and a top-right frame 512 are two frames from an omni-video. A center-left map 514 is the D-map of the scene, with darker points 515 representing higher order inconsistency. A center-right map 516 is the thresholded D-map with $D_t=0.50$. A bottom image 518 is the detection based on a single Gaussian model for each pixel. The weak illumination change in the right part of the scene is due to objects somewhat blocking the light source.

From the bottom image 518 it can be seen that even minor sudden illumination changes can invalidate the simple method. In the center-left and center-right maps 514 and 516, respectively, the presently disclosed method finds the objects while suppressing the sudden illumination change caused by the objects.

Thus, the above examples show that the method is able to ignore significant illumination changes. The pixel-level miss detection rate can be quite significant where the detected objects are quite fragmented. Grouping methods such QCC, as known in the art, combined with other information, such as, for example, the scene geometry and object features, may be used to attain increased performance for such situations.

Performance analysis of the algorithm and threshold parameter selection is now addressed. Because the D measurement is not directly derived from the distributions of the background and object pixels, it is difficult to give an analytical description for the distribution of D as a function of object and background statistics. Therefore, simulation is used to show how the system behaves when the input parameters of the system change.

The neighborhood patches are classified into two types: homogeneous and highly textured. For the homogeneous case, the neighboring pixels have identical ideal values in both frames. The highly textured case assumes that the neighboring pixels have ideal values that are far apart. For the homogeneous setting, a Gaussian distribution is used to simulate either the background or the object, but with different means and variances. For the highly textured setting, a Mixture of Gaussians ("MoG") distribution is used to simulate the pixel values. The sudden illumination change is modeled as a multiplier to the pixels in the first frame. The multiplier is Laplacian-distributed with center 1.

For each experiment there are two simulation steps: (1) Sudden Illumination Change Simulation: Here, two pixels from the background are considered in the reference frame. A random multiplier is applied to both the pixel values to obtain the pixels in the second frame as a result of a sudden illumination change. Then camera noise is added to the four pixel measurements to obtain the observed values. D is then computed. (2) Object Simulation: Here, there is presumed to be no illumination change, but there is an object in the scene.

In this situation, the two cases for the current frame are distinguished as follows: i) the case where the two pixel measurements being compared are in the interior of the object and are therefore samples from object distribution, and ii) the case where the two pixel measurements are in the boundary of the object with one sample from the object and the other from the background distribution. The perimeter to area ratio of an object ("edge ratio") is the proportion of the number of edge pixels to the number of all pixels of an object. The edge ratio is an adjustable parameter in the simulation. A high edge ratio is used to simulate small objects, and a low edge ratio to simulate large objects. The camera noise is added and D is computed.

The distributions of D for (1) and (2) provide a mechanism to estimate the pixel level false alarm probability $P_{fa}$ and miss detection probability $P_{md}$. In addition, the distributions are used to select $D_t$ for the simple D-map thresholding method.

In the simulation, the homogeneous background pixels have a Gaussian distribution N(50, 1) and the homogeneous object pixels have a Gaussian distribution N(70, 1). The highly textured background pixels have an MoG distribution: N(30, $10^2$), N(80, $10^2$), N(150, $10^2$) and N(220, $10^2$), with mixing proportions 0.2, 0.3, 0.4 and 0.1, respectively. The highly textured object pixels have an MoG distribution: N(50, $30^2$), N(100, $50^2$), N(170, $40^2$) and N(220, $25^2$), with mixing proportions 0.2, 0.3, 0.4 and 0.1, respectively.

Figure 6:
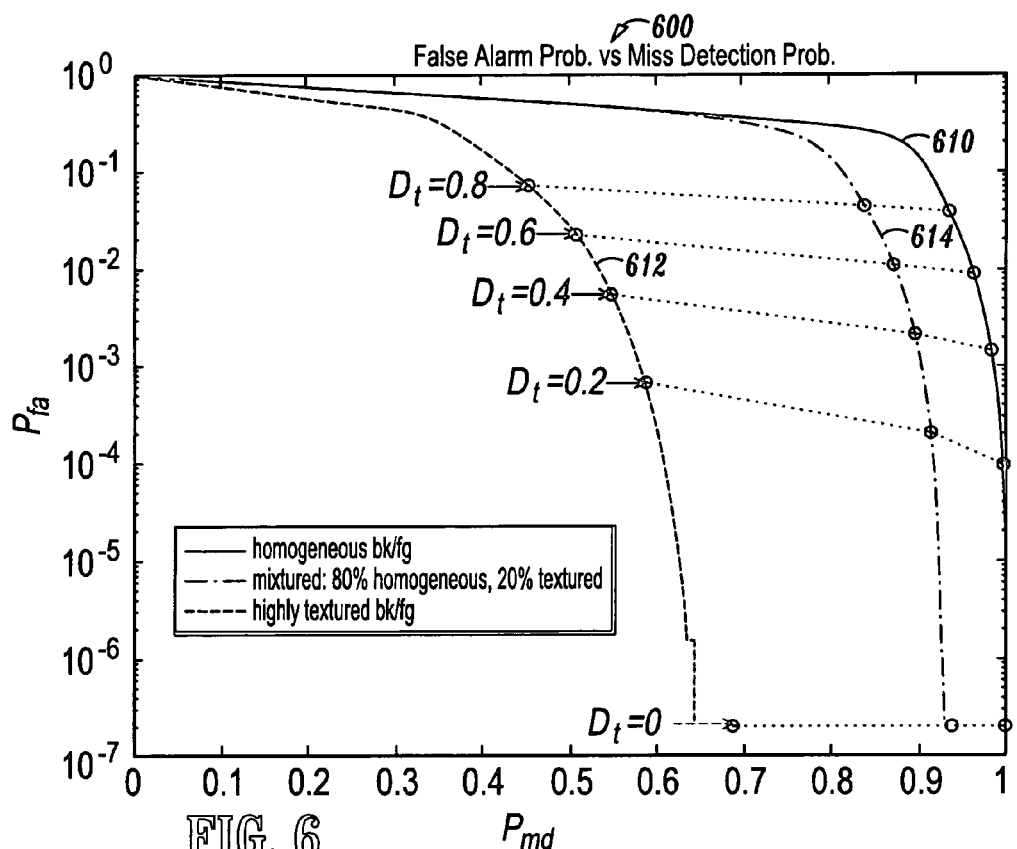
FIG. 6 shows a graph of false alarm probability versus miss detection probability for the system of FIG. 1.

Turning now to FIG. 6, a graph of false alarm probability versus miss detection probability is indicated generally by the reference numeral 600. The graph 600 includes three setting plots: a homogeneous plot 610, a highly textured plot 612, and mixture of the two plot 614. Under homogeneous settings, the plot 610 shows the performance of the method because there is no true underlying ordering preference in the ideal input (i.e. the signal to noise ratio is very low). The highly textured setting gives the plot 612 showing a lower $P_{md}$ for a comparable $P_{fa}$.

Figure 7:
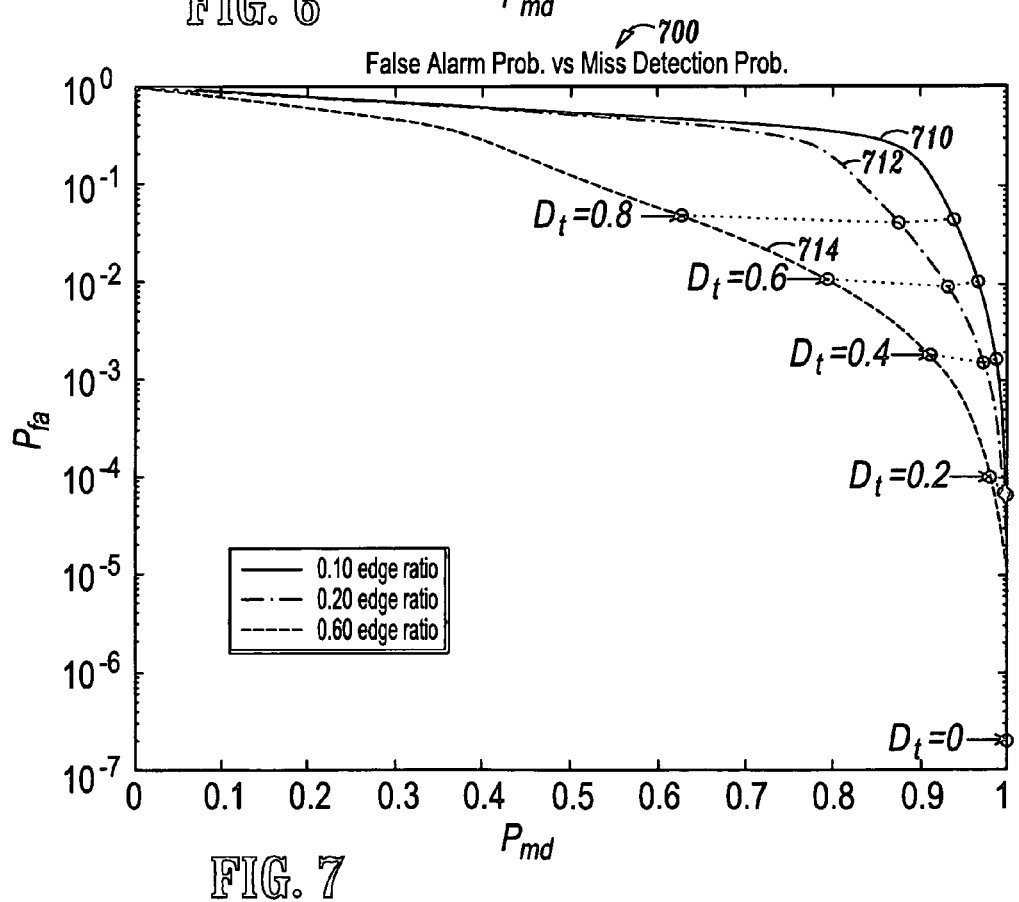
FIG. 7 shows another graph of false alarm probability versus miss detection probability for the system of FIG. 1.

As shown in FIG. 7, another graph of false alarm probability versus miss detection probability is indicated generally by the reference numeral 700. The graph 700 includes three edge-ratio plots that show how edge ratio affects the performance in the homogeneous setting. A plot 710 corresponds to an edge ratio of 0.10. A plot 712 corresponds to an edge ratio of 0.20. In addition, a plot 714 corresponds to an edge ratio of 0.60. Thus, it can be seen that objects with high edge ratios are favorable for the system, because the method can easily detect the edge of the homogeneous object as opposed to the inner part. Thus, highly textured backgrounds and objects are favorable for detection. For the homogeneous case, small objects, which generally have a greater edge proportion, are favorable for detection.

Within model assumptions, low false alarm probabilities can be easier to achieve than low miss detection probabilities. The maximum miss detection probability relies on the nature of the background and object. If the scene is highly textured, the method tends to achieve a low miss detection rate while maintaining a similar false alarm rate. In the real system, because the scene may not have a strong texture, i.e. $D_t \rightarrow 0$, $P_{md}$ is quite high, a very low $D_t$ is not used. Instead, to get the balance of $P_{fa}$ and $P_{md}$, a moderate $D_t$ is used, such as, for example $D_t$=0.5.

Thus, the described sudden change detection method is motivated from a statistical model derived from the physics of the imaging process. The approach concentrates on local neighborhood order checking to reduce computational complexity. While the assumptions are reasonable in most of the image, some neighborhoods may violate the smoothness conditions for local geometry and illumination. The algorithm is less reliable in homogeneous areas where the signal-to-noise ratio is low (i.e. where ordering information is absent).

The presented method is usable with an existing surveillance system. By obtaining a quantitative measure of the reliability of the method, the results can be consistently fused with other measurements. Other possible embodiments could be based on exploiting multi-scale information, use of grouping methods, and/or exploiting further global information on illumination, as may be recognized by those of ordinary skill in the pertinent art. It is also worthwhile to incorporate other known knowledge of the scene, such as, for example, possible object orientation, shape, and/or size, to maximize the capabilities of the system or meet design criteria.

The disclosed technique can be applied to many appearance-based image acquisition problems in addition to surveillance images. Alternate examples may include automatic object detection on assembly lines by machine vision, human face detection in security control, and the like. As shall be recognized by those of ordinary skill in the pertinent art, the term "image" as used herein may also represent three-dimensional, four-dimensional, and higher dimensional datasets in alternate embodiments.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

TABLE A $$E_1 \leq E_2 \Rightarrow z_1 \leq z_2 \quad (1)$$

$$E(x) = \frac{1}{r(x) + k}\left\{K_a(x)I_a + K_d(x)\sum_i I_i(x)\cos\theta_i(x) + K_s(x)\sum_i I_i(x)\cos^{n(x)}[\phi_i(x)]\right\} \quad (2)$$

$$E(x) = \frac{1}{r + k}\left\{K_a(x)I_a + K_d(x)\sum_i I_i(x)\cos\theta_i\right\} \quad (3)$$

$$E(x_2) - E(x_1) = \frac{1}{r + k}\left\{[K_a(x_2) - K_a(x_1)]I_a + [K_d(x_2) - K_d(x_1)]\sum_i I_i\cos\theta_i\right\} \quad (4)$$

$$\text{sign}(E(x_2) - E(x_1)) = \text{sign}(K_d(x_2) - K_d(x_1)) \quad (5)$$

TABLE A-continued $$z = f(\hat{e}) = f(e + N_s + N_{c_1}) = f(e) + N_e \quad (6)$$

$$N_e = f'(e)(N_s + N_{c_1}) \quad (7)$$

$$\sigma_{N_e}^2 = (f'(e)|_{e=g(z)})^2[(g(z) - b)\sigma_s^2 + \sigma_{c_1}^2] \quad (8)$$

$$\hat{z} = z + N_z = f(e) + N_z \quad (9)$$

$$\sigma_{N_z}^2 = \sigma_{c_2}^2 + (f'(e)|_{e=g(z)})^2[g(z)\sigma_s^2 + \sigma_{c_1}^2] \quad (10)$$

$$D = \sqrt{P_1 P_2} + \sqrt{(1 - P_1)(1 - P_2)} \quad (11)$$

What is claimed is:

1. A method for object detection with sudden illumination changes, the method comprising:
    providing a first image having a plurality of pixels;
    receiving a second image corresponding to a time other than that of said first image;
    calculating a difference map between said first and second images;
    selecting a pair of pixel locations from at least one of said first and second images in accordance with said difference map;
    statistically modeling a camera noise level for at least one of said first and second images;
    computing the likelihood of order inconsistency between a pair of pixel values at said selected locations in said first image and a pair of pixel values at said selected locations in said second image in accordance with said camera noise level; and
    detecting a changed object in accordance with said computed likelihood,
    wherein the sign of the difference between the incident radiances of a pair of pixels in said first image is the same as the sign of the difference between the sensed pixel values.

2. A method as defined in claim 1 wherein said second image is temporally consecutive with said first image.

3. A method as defined in claim 1, further comprising maintaining said first image as a reference for calculating a plurality of difference maps corresponding to a plurality of second images.

4. A method as defined in claim 1, further comprising mixing said first image with at least one past image.

5. A method as defined in claim 4 wherein mixing comprises pixel averaging.

6. A method as defined in claim 1 wherein said first image is a separately maintained background image.

7. A method as defined in claim 1, further comprising photometrically calibrating said statistical model for camera noise.

8. A method as defined in claim 1, further comprising applying a monotone but non-linear camera response function to at least one of said first and second images.

9. A method as defined in claim 8, further comprising photometrically calibrating said camera response function.

10. A method as defined in claim 1 wherein a change in at least one of camera gain and illumination level does not alter the difference between the incident radiances of said pair of pixels for an unchanged object, which remains the same as the sign of the difference between the sensed pixel values.

11. A method as defined in claim 1 wherein said comparing the sign comprises applying a Phong shading model for the surface material.

12. A method as defined in claim 1 wherein said detecting a changed object is responsive to local pixel information.

13. A method as defined in claim 1 wherein said detecting a changed object is not compromised by a sudden illumination change.

14. A system for object detection with sudden illumination changes, the system comprising:
  providing means for providing a first image having a plurality of pixels;
  receiving means for receiving a second image corresponding to a time other than that of said first image;
  calculating means for calculating a difference map between said first and second images;
  selecting means for selecting a pair of pixel locations from at least one of said first and second images in accordance with said difference map;
  modeling means for statistically modeling a camera noise level for at least one of said first and second images;
  computing means for computing the likelihood of order inconsistency between a pair of pixel values at said selected locations in said first image and a pair of pixel values at said selected locations in said second image in accordance with said camera noise level; and
  detecting means for detecting a changed object in accordance with said computed likelihood,
  wherein the sign of the difference between the incident radiances of a pair of pixels in said first image is the same as the sign of the difference between the sensed pixel values.

15. A system as defined in claim 14, further comprising:
  a camera model unit for computing a difference map between a first input image and a second input image;
  an illumination model unit in signal communication with the camera model unit for comparing the sign of the difference between two pixels in a first input image against the sign of the difference between two pixels in a second input image; and
  a CPU in signal communication with said camera model unit and said illumination model unit for detecting a changed object in accordance with said comparison when said sign of the difference is changed.

16. A system as defined in claim 15 wherein at least one of said first and second input images comprises a surveillance image.

17. A system as defined in claim 15, further comprising:
  a display adapter in signal communication with the CPU for displaying at least one of said map and said first and second input images; and
  an I/O adapter in signal communication with the CPU for recalling the locations of the pixels from the displayed image to provide an indication of the location of a changed object within an input image.

18. A system as defined in claim 15, further comprising:
  a user interface adapter in signal communication with the CPU for at least receiving a selection decision for at least one image from a user.

19. A system as defined in claim 14 wherein said second image is temporally consecutive with said first image.

20. A system as defined in claim 14, further comprising maintaining means for maintaining said first image as a reference for calculating a plurality of difference maps corresponding to a plurality of second images.

21. A system as defined in claim 14, further comprising mixing means for mixing said first image with at least one past image.

22. A system as defined in claim 21 wherein said mixing means comprises pixel averaging means.

23. A system as defined in claim 14 wherein said first image is a separately maintained background image.

24. A system as defined in claim 14, further comprising first calibrating means for photometrically calibrating said statistical model for camera noise.

25. A system as defined in claim 14, further comprising second modeling means for applying a monotone but non-linear camera response function to at least one of said first and second images.

26. A system as defined in claim 25, further comprising second calibration means for photometrically calibrating said camera response function.

27. A system as defined in claim 14 wherein a change in at least one of camera gain and illumination level does not alter the difference between the incident radiances of said pair of pixels for an unchanged object, which remains the same as the sign of the difference between the sensed pixel values.

28. A system as defined in claim 14 wherein said comparing the sign comprises applying a Phong shading model for the surface material.

29. A system as defined in claim 14 wherein said detecting a changed object is responsive to local pixel information.

30. A system as defined in claim 14 wherein said detecting a changed object is not compromised by a sudden illumination change.

31. A program storage device readable by machine, tangibly embodying a program of instructions executable by the machine to perform method steps for object detection with sudden illumination changes, the method steps comprising:
  providing a first image having a plurality of pixels;
  receiving a second image corresponding to a time other than that of said first image;
  calculating a difference map between said first and second images;
  selecting a pair of pixel locations from at least one of said first and second images in accordance with said difference map;
  statistically modeling a camera noise level for at least one of said first and second images;
  computing the likelihood of order inconsistency between a pair of pixel values at said selected locations in said first image and a pair of pixel values at said selected locations in said second image in accordance with said camera noise level; and
  detecting a changed object in accordance with said computed likelihood,
  wherein the sign of the difference between the incident radiances of a pair of pixels in said first image is the same as the sign of the difference between the sensed pixel values.

32. A program storage device as defined in claim 31 wherein said second image is temporally consecutive with said first image.

33. A program storage device as defined in claim 31, the method steps further comprising maintaining said first image as a reference for calculating a plurality of difference maps corresponding to a plurality of second images.

34. A program storage device as defined in claim 31, the method steps further comprising mixing said first image with at least one past image.

35. A program storage device as defined in claim 34 wherein the method step of mixing comprises pixel averaging.

36. A program storage device as defined in claim 31 wherein said first image is a separately maintained background image.

37. A program storage device as defined in claim 31, the method steps further comprising photometrically calibrating said statistical model for camera noise.

38. A program storage device as defined in claim 31, the method steps further comprising applying a monotone but non-linear camera response function to at least one of said first and second images.

39. A program storage device as defined in claim 38, the method steps further comprising photometrically calibrating said camera response function.

40. A program storage device as defined in claim 31 wherein a change in at least one of camera gain and illumination level does not alter the difference between the incident radiances of said pair of pixels for an unchanged object, which remains the same as the sign of the difference between the sensed pixel values.

41. A program storage device as defined in claim 31 wherein said comparing the sign comprises applying a Phong shading model for the surface material.

42. A program storage device as defined in claim 31 wherein said detecting a changed object is responsive to local pixel information.

43. A program storage device as defined in claim 31 wherein said detecting a changed object is not compromised by a sudden illumination change.

* * * * *